A. C. LEICH & J. S. BERNER.
ICE CREAM SANDWICH MACHINE.
APPLICATION FILED MAR. 26, 1917.
1,232,576.
Patented July 10, 1917.
2 SHEETS—SHEET 1.
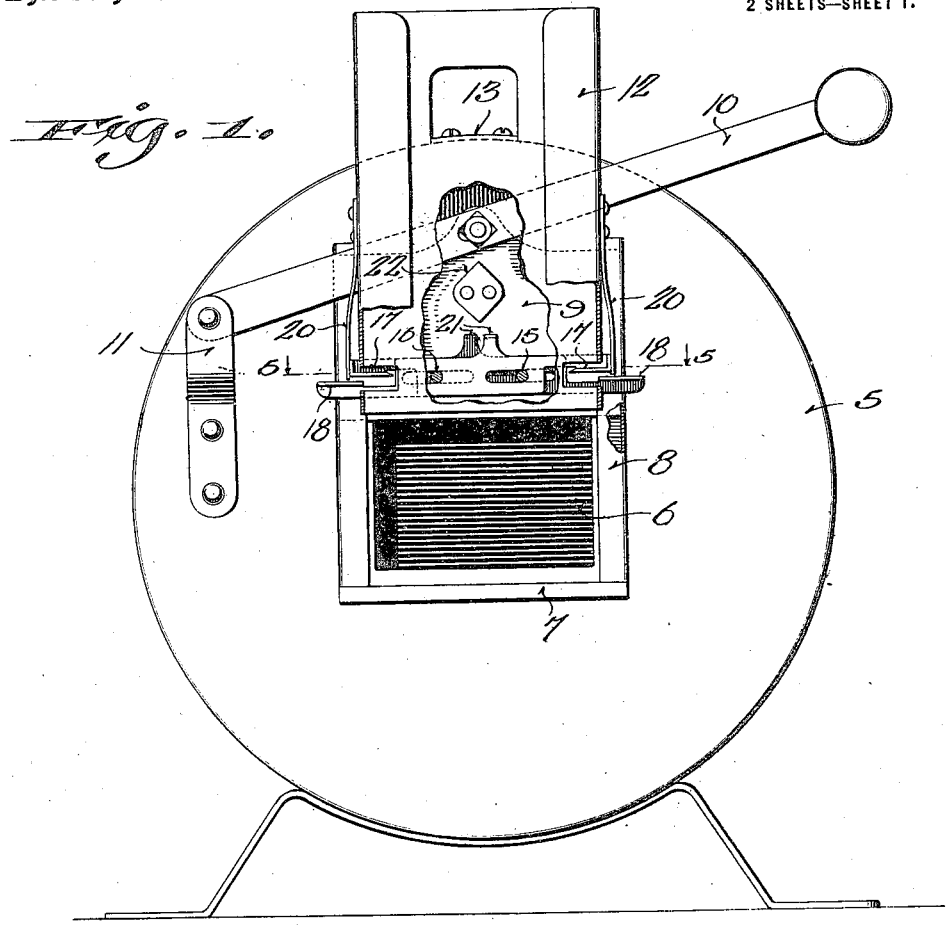
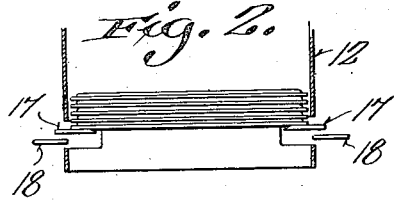
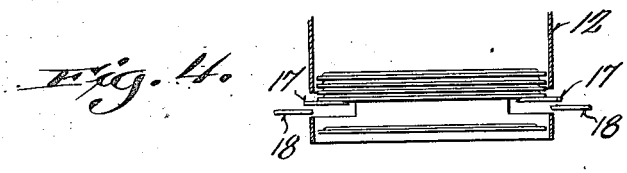

A. C. LEICH & J. S. BERNER.
ICE CREAM SANDWICH MACHINE.
APPLICATION FILED MAR. 26, 1917.
1,232,576.
Patented July 10, 1917.
2 SHEETS—SHEET 2.
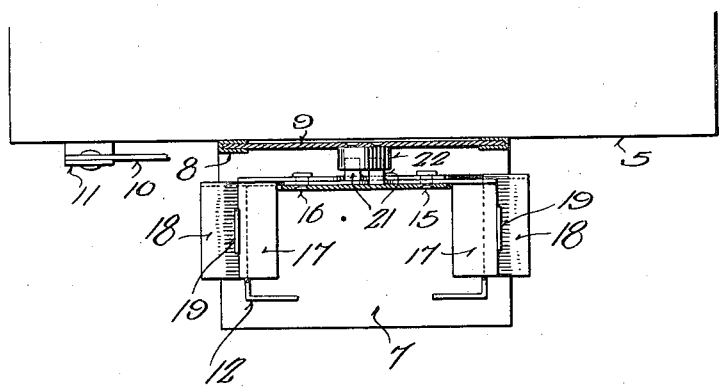
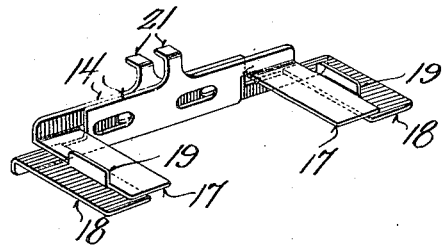

UNITED STATES PATENT OFFICE.

ARTHUR C. LEICH AND JESSE S. BERNER, OF MILWAUKEE, WISCONSIN.

ICE-CREAM-SANDWICH MACHINE.

1,232,576.　　　　　　　Specification of Letters Patent.　　　Patented July 10, 1917.

Application filed March 26, 1917. Serial No. 157,373.

*To all whom it may concern:*

Be it known that we, ARTHUR C. LEICH and JESSE S. BERNER, both citizens of the United States, and residents of Milwaukee, in the county of Milwaukee and State of Wisconsin, have invented certain new and useful Improvements in Ice-Cream-Sandwich Machines; and we do hereby declare that the following is a full, clear, and exact description thereof.

Our invention relates to new and useful improvement in machines for making ice-cream sandwiches. Machines have been heretofore in use for slicing a brick of ice-cream, and the operation of supplying the biscuits to the slices of ice-cream has been performed manually, with a consequent loss of time and objection from a sanitary stand-point.

It is therefore primarily the object of our invention to provide a means for automatically feeding the biscuits of ice-cream sandwiches coincident with the slicing operation of the ice-cream, whereby upon each actuation of the machine a complete assembled sandwich will be formed. A further object resides in the provision of a biscuit feeding device of this kind which is exceedingly simple in construction, and positive in operation and which is adapted for operation directly by the slicing blade of the machine upon movement thereof in either direction.

With the above and other objects and advantages in view, the invention resides more particularly in the novel combination, arrangement and formation of parts hereinafter described and pointed out in the appended claims.

Figure 1 is a front elevational view of an ice-cream sandwich machine embodying our invention.

Figs. 2, 3 and 4 are diagrammatic views showing the successive steps in feeding a biscuit.

Fig. 5 is a transverse sectional view through the feeding mechanism on the line 5—5 of Fig. 1.

Fig. 6 is a perspective view of the feeding plates.

Referring now more particularly to the accompanying drawings, 5 designates the horizontally disposed cylindrical jacketed casing of an ice-cream sandwich machine, which is provided with the oblong passage 6 therethrough adapted to contain the ice-cream, and which carries at the front of the passage a table 7 adapted to receive the slices of ice-cream as they are cut from the brick. At the sides of the front of the passage 6 are provided the usual guideways 8 for a vertically reciprocative knife plate 9 which is operated by a handle lever 10 having its intermediate portion loosely connected therewith and pivoted at one end of a bracket 11 on the forward end of the casing.

Our biscuit feeding mechanism comprises a vertically extended biscuit supply chamber 12 secured to the body casing 5 as by the laterally turned ear 13 at its upper portion, and the rear wall of the supply chamber is spaced forwardly of the casing 5 sufficiently to provide proper play of the knife lever 10 and terminates at its lower end immediately above the top of the ice-cream passage 6. A pair of horizontally disposed plates 14 are slidably secured to the lower portion of the rear wall of the supply chamber 12 by bolts 15 projecting from said wall and slidable in longitudinal slots 16 in the plates. Each of the plates is provided at its ends with a pair of forwardly extending blades 17 and 18 respectively disposed in vertically offset relation, a pair of blades 17 being thus provided which are spaced above the horizontal plane of a pair of blades 18 a distance substantially equal to the width of one biscuit. Secured to the sides of the casing and bearing against up-turned lugs 19 of the plates 17 are leaf springs 20 which normally urge said plates inwardly to support the biscuits within the supply chamber. Upon sliding the plates 14 against the action of these springs, the blades 18 will move inwardly and the blades 17 will move outwardly to permit the body of biscuits to drop on to the blades 18. A reverse movement of the blades caused by the action of the springs 20 will then move the blades 17 inwardly between the lowermost biscuit and the body of biscuits, and will simultaneously move the blades 18 outwardly to thus release the bottom biscuit, it being noted that the blades 17 are preferably sharpened on their inner edges to facilitate their insertion between the biscuits, although this insertion is facilitated by the space which occurs between the edges of the biscuits due to the corrugations of the intermediate biscuit portions.

For effecting this reciprocative movement of the plates to successively release the biscuits, each of the plates 14 is provided adjacent its central portion with a pair of rearwardly extending fingers 21 and the knife blade 9 is provided with a diamond-shaped cam block 22 adapted to engage between the fingers upon movement therepast in either direction, and force the blades 17 outwardly with a consequent inward movement of the blades 18, the actual releasing actuation of each biscuit being procured by a return movement due to the force of the springs 20.

Thus at each limit of movement of the knife lever 10, a biscuit is released, and in the formation of a sandwich, upward movement of the lever would release a biscuit which would drop upon the table 7, downward movement of the lever would slice the ice-cream, and in the latter portion of downward movement of the lever, the second biscuit would be released to complete the sandwich, it being appreciated that if desired, suitable means could be provided for positively guiding the biscuits upon their releasing movement.

While we have shown and described a preferred embodiment of our invention, the essential feature thereof resides in the position of a machine for feeding and properly assembling the portions of an ice-cream sandwich and various modifications of structure and arrangement may be resorted to without departing in any manner from our invention.

What is claimed is:

1. An ice-cream sandwich machine comprising an ice-cream chamber, a knife plate reciprocative at the forward end thereof, a biscuit supply chamber disposed forwardly of the path of movement of the knife and means operated by the movement of the knife for feeding biscuit from the chamber.

2. An ice-cream sandwich machine comprising a slicing means including a reciprocative knife plate, a biscuit supply chamber disposed there adjacent, feeding means at the lower end of said biscuit supply chamber, and a cam on the knife plate engageable with said biscuit feeding means to procure operation thereof upon movement of the plate.

3. An ice-cream sandwich machine comprising a slicing means including a reciprocative knife plate, a biscuit supply chamber, feeding means at the lower end of said supply chamber comprising horizontally slidable plates and lateral biscuit seating blades carried by said plates, cam engaging portions on the plates and a cam movable with the knife plate and engageable with said portions to procure opposite movement of the slidable plates and means for procuring return movement of the plates.

4. An ice-cream sandwich machine comprising a slicing means including a reciprocative knife plates, a biscuit supply chamber, feeding means at the lower end of said supply chamber comprising slidable plates and lateral biscuit seating blades carried by said plates, cam engaging portions on the plates to slide the plates in opposite directions upon movement of the knife plate in either direction a cam movable with the knife and means for procuring return movement of the plates.

5. An ice-cream sandwich machine comprising a slicing means including a reciprocative knife plate, a biscuit supply chamber, feeding means at the lower end of said supply chamber comprising slidable plates and lateral biscuit seating blades carried by said plates, cam engaging portions on the plates and a diamond-shaped cam movable between said portions to slide the plates in opposite directions upon movement of the knife plate in either direction and leaf springs engageable with said plates for procuring return movement thereof.

6. An ice-cream sandwich machine comprising an ice-cream chamber, a knife plate reciprocative at the forward end thereof, a biscuit supply chamber disposed forwardly of the knife plate and above the ice-cream chamber, plates horizontally slidably secured to the lower portion of the rear wall of the supply chamber, forwardly extending upper and lower pairs of blades carried by the plates and adapted to alternately project into the supply chambers and means for procuring opposite sliding movements of the plates upon reciprocation of the knife plate.

In testimony that we claim the foregoing we have hereunto set our hands at Milwaukee, in the county of Milwaukee and State of Wisconsin, in the presence of two witnesses.

ARTHUR C. LEICH.
JESSE S. BERNER.

Witnesses:
FRANK S. RATCLIFFE,
M. E. DOWNEY.